US006521690B1

(12) United States Patent
Ross et al.

(10) Patent No.: US 6,521,690 B1
(45) Date of Patent: Feb. 18, 2003

(54) SMECTITE CLAY/ORGANIC CHEMICAL/ POLYMER COMPOSITIONS USEFUL AS NANOCOMPOSITES

(75) Inventors: Mark Ross, Newtown, PA (US); Jacob Kaizerman, Bradley Beach, NJ (US)

(73) Assignee: Elementis Specialties, Inc., Hightstown, NJ (US)

( * ) Notice: Subject to any disclaimer, the term of this patent is extended or adjusted under 35 U.S.C. 154(b) by 0 days.

(21) Appl. No.: 09/317,963

(22) Filed: May 25, 1999

(51) Int. Cl.[7] .............................. C08J 3/00; C08K 5/00; C08K 3/34; C08K 5/16; C08L 67/00

(52) U.S. Cl. ........................ 524/445; 523/508; 524/186; 524/236

(58) Field of Search ................................. 524/445, 186, 524/236; 523/508

(56) References Cited

U.S. PATENT DOCUMENTS 4,412,018 A * 10/1983 Finlayson et al. .......... 523/508

* cited by examiner

*Primary Examiner*—Patrick D. Niland
(74) *Attorney, Agent, or Firm*—Michael J. Cronin

(57) ABSTRACT

This invention is of a composition comprised of a smectite clay modified with an organic chemical composition and a polymer. The composition consists of an organic chemical/ smectite clay intercalate that has been ion-exchanged and reacted and intercalated with one or more quarternary ammonium compounds and an anionic material and further blended into a polymer resin to make a nanocomposite composition. This material can be blended into a wide variety of polymers. This kind of system gives improved dispersion over conventional organoclays, intercalates or hybrid clays described in the literature, especially in non-polar resins. The defined organoclay has been found to be highly dispersible in a variety of polymers, whether polar or non-polar.

7 Claims, No Drawings

SMECTITE CLAY/ORGANIC CHEMICAL/ POLYMER COMPOSITIONS USEFUL AS NANOCOMPOSITES

BACKGROUND OF THE INVENTION

1. Field of the Invention

The present invention is directed to improved polymer compositions that are made from a polymer blended with a smectite clay that has been reacted with a specified mixture of organic materials. The inventive compositions have the property that when the specified organically modified clay is added to the polymer, an exceptionally well dispersed composite results which is useful as a polymer nanocomposite. Polymer nanocomposites have enhanced structural and other properties that make them desirable materials for an ever growing number of uses.

2. Background of the Invention

Organically modified clays, also called organoclays, have been used for many years as rheological additives for solvent based systems. They are usually produced by making a water dispersion of a phyllosilicate clay, usually a smectite clay, and adding to it a quaternary ammonium salt of a long chain fatty acid to produce an organically modified clay by cation exchange reaction and adsorption. The reaction may cause the organoclay to coagulate from the water dispersion which allows for its isolation by filtration and washing. Similarly, organoclays can be made without water by extrusion mixing, with heat and shear, smectite clay and the quaternary ammonium compound or compounds with no water or other solvent being present.

Polymers, resins and plastics containing clay additives have recently become widely used as replacements for heavier steel and other metal products, especially in the field of automotive manufacturing. They have also found use in a growing number of other areas, including as bridge components and as replacements for heavier steel parts in ship construction. Using extrusion and injection molding, a nylon matrix, for example, has been successfully reinforced with smectite-type clays (and organoclays based on the smectite clays, bentonite and hectorite) dispersed therein to form molecular composites of nylon and finely dispersed silicate clay platelet layers. Such products, often called nanocomposites, have enhanced structural, tensile, impact and flexural strength.

The behavior of the resultant plastic/clay product (or nanocomposite) is qualitatively different from that exhibited by the plastic, polymer or resin alone and has been attributed by some workers in the field to the confinement of the matrix chains between the clays millions of microscopic layers. It has long been known that bentonite and hectorite are clays which are composed of flat silicate platelets of a thickness no more than about one nanometer.

The nanocomposite products created to date have important commercial applications not only in the applications discussed above but also in diverse areas such as where ultrathin polymer films confined between adsorbed surfaces are involved. These uses include polymer composites for polymer adhesives and films including polyethylene.

The clays used are typically smectite clays which are layered phyllosilicates. Smectite clays possess some structural characteristics similar to the more well-known minerals talc and mica. Their crystal structures consist of two-dimensional layers formed by fusing two silica tetrahedral sheets to an edge-shared dioctahedral or trioctahedral sheet of either alumina (for example bentonite) or magnesia (for example hectorite)—each of the different smectite clays having somewhat different structures. Stacking of these layers in nature in depths of hundreds or more caused by ionic and weak Van der Waals forces leads to voids or chambers between the separate layers. These chambers are occupied by cations which balance the charge deficiency that is generated by isomorphous substitution (often called disharmonies) within the platelet lattices.

Nanocomposites are most often prepared today using organically modified, silicates or organoclays produced by a cation exchange reaction between the silicate and an alkylammonium salt (usually quaternary ammonium compounds). The alkyl cations exchanged onto the natural clay platelets render the hydrophilic clay organophilic and this transformation makes the clay more easily dispersible into the polymer or plastic. Although excellent sorbents for some organics, natural bentonite and hectorite are themselves very hydrophilic.

3. Description of the Prior Art

The earliest scientific work using organoclays in the preparation of nanocomposites is reflected in U.S. Pat. No. 2,531,396, issued to a predecessor of Rheox, Inc., the assignee of this invention. This patent, filed in 1947, teaches the use of organically modified bentonites to provide structural reinforcement to elastomers, such as rubber, polychloroprene and polyvinyl compounds. Over a generation later, additional patents begin to appear. A number of patents obtained by Toyota starting in 1984: U.S. Pat. Nos. 4,472,538; 4,739,007; 4,810,734; 4,889,885; and 5,091,462 use organoclay additives for plastics and describe plastic structures commercially used, for example, to replace aluminum components in automobiles.

Manufacture to date of nanocomposite materials has often involved mixing an organoclay with a polymer powder, pressing the mixture into a pellet, and heating at the appropriate temperature. For example, polystyrene has been intercalated by mixing polystyrene with an alkylammonium montmorillonite and heating in vacuum. Temperature of heating is chosen to be above the bulk glass transition temperature of polystyrene, ensuring polymer melt.

Representative U.S. Pat. No. 4,810,734 to Toyota describes a different process for producing a composite material which comprises a step of contacting a layered smectite clay mineral having a cation exchange capacity of up to 200 milliequivalents per 100 g with a swelling agent in the presence of a dispersion medium, thereby forming a complex which has the property of being swollen by a molten monomer of a polymer, and a polymerization step of polymerizing said monomer in said mixture. The "swelling agent" used is one which has both an onium ion and a functional group capable of reacting with a polymer. Toyota U.S. Pat. No. 4,889,885 describes a composite material, which comprises (a) at least one resin selected from the group; consisting of a vinyl-based polymeric compound, a thermosetting resin and a rubber, and (b) a layered bentonite uniformly dispersed in the resin, the layered silicate having a layer thickness of about 7 to 12 Å and an interlayer distance of at least about 30 Å, where at least one resin is connected to a layered silicate through an intermediate.

There are a number of ECC America patents issued starting around 1987 where gaseous $NH_3$ is used to provide modification of the smectite clay surfaces prior to making a nanocomposite—See U.S. Pat. Nos. 4,690,868 and 4,798,766.

Two other major companies appear to be working in the field; Amcol International Corporation and AlliedSignal.

Both have issued recent patents in the area of this invention. See for example AlliedSignal's U.S. Pat. Nos. 5,514,734 and 5,385,776—these patents are in general directed toward a nylon 6 matrix and clays using non-standard organic modifications. See also in this regard Vaia et al., the article entitled *Synthesis and Properties of Two-Dimensional Nano Structures By Direct Intercalation of Polymer Melts in Layered Silicates,* Chemical Materials 1993, 5, pages 1694–1696. An additional patent, WO 93/04118 from Allied, discusses nanocomposite materials of polymer matricles with platelets having an average thickness of less than 50 Å having chemicial species bonded to them. This patent gives several examples of nanocomposites comprising nylon, PET and polypropylene (PP). While the nylon samples used up to 6% dispersed clay, the PET example used only 0.38% clay and the PP example only 0.14% clay. Property improvements in tensile modulus for the PP example were only about 10%, which is within the normal measurement error. The use of such low levels of clay to gain such a modest property benefit suggests that the clay dispersion was inadequate using more efficacious amounts such as used in the nylon examples.

Amcol International Corporation (Amcol) has been issued as least three recent patents, U.S. Pat. Nos. 5,552,469, 5,578,672 and 5,698,627 which teach the exclusion from their clay-based nanocomposites of "onium ion" products (which would include most known commercial organoclays made with traditional quaternary ammonium compounds). See also Amcol U.S. Pat. No. 5,721,306.

European patent application (WO 99/03914) discloses a dispersant that is an intercalant of a clay that uses, in its broadest definition, a water-dispersible polymer that has at least an inherent viscosity of 0.1 dL/g, which defines low or higher molecular weight polymers. The clay-intercalant, discussed on page 5, line 3 of the European patent application, discusses the "dispersible polymers . . . strongly influenced by the presence of anionic sulfo-salt modification". The clay minerals used can include, "untreated or metal intercalated, organically modified through cation ion exchange; intercalated with other high molecular weight pretreatment compounds." The exemplary claim of the patent application discloses a dissipatible disperse clay material into a polyester polymer.

Several patents of the Cornell Research Foundation have issued—U.S. Pat. Nos. 5,032,546, 5,032,547 and 5,554,670. One or more of these patents describe the use of organoclays in thermoplastics to form nanocomposites.

General Electric Company U.S. Pat. No. 5,530,052 describes silicate materials, including montmorillonite clays, modified with at least one heteroaromatic cation and used as additives to specified polymers to make nanocomposites.

Other prior art shows making polymer-clay intercalates directly by reaction of the monomers in the presence of clays. See *Interfacial Effects On The Reinforcement Properties Of Polymer Organoclay Nanocomposites,* H Shi, T Lan, T H Pinnavaia, Chemistry of Materials, 1996, pages 88 et seq.

While not related to nanocomposites, Rheox, Inc. has issued patents describing organoclay compositions useful as rheological additives which comprise the reaction product of smectite clay, quaternary ammonium compounds and organic anions wherein a quaternary-organic anion complex is intercalated with the smectite clay. These patents comprise U.S. Pat. Nos. 4,412,018, 4,434,075 and 4,517,112 (descriptions herein incorporated by reference) and are described to include a large variety of organic compounds, including carboxylic and sulfonic acids, capable of reacting with the quaternary used. These patents do not describe the use of these organoclays in thermoplastic polymers.

A recently filed patent application by the assignee hereof (U.S. patent application Ser. No. 09/064,216 filed Apr. 22, 1998) describes a hybrid organoclay system that gives improved dispersion in a polyester resin over conventional organoclays or simple intercalates to form a nanocomposite.

One of the more vexing problems in the nanocomposites field is the manufacture of useful composites with non-polar resins. Such resins as polyethylene, polypropylene and fluoropolymers can benefit from the reinforcing and other enhancements of nanocomposites but, up until now, it has been too difficult to incorporate organoclays into them directly. Indeed, Professor Giannelis of Cornell University (*Adv. Materials* 1996, 8, No. 1, p29) has stated, "Ideally, polymers should be polar or contain groups capable of interacting with the silicate surface. If the enthalpy cannot compensate for the entropy penalty no intercalation will take place leading to undispersed or immiscible hybrids." Such undispersed hybrids will result in poor properties in the final resin composite. Workers in the field have devised a number of complex systems to avoid this problem. Hasegawa (N. Hasegawa, M. Kawasumi, M. Kato, A. Usuki, and A. Okada, *Preparation And Mechanical Properties Of Polypropylene-Clay Hybrids Using A Maleic Anhydride Modified Polypropylene Oligomer,* JAPS 67, 87, 1998) has used a maleic anhydride grafted system to improve the compatibility of the polymer with the clay. A similar idea using grafted polypropylene is proposed by Inoue and Hosokawa in European Patent No. 807659. Fukui in U.S. Pat. Nos. 5,091,462 and 5,206,284 uses a modified nylon graft polyethylene to create compatibility with the clay. Serrano, Beall and Cruz in European Patent No. 822163 propose a complex process involving intercalants and organic solvents at high temperatures to make a nanocomposite with non-polar resins. All these attempts require special resin modifications or create complex, costly schemes to improve organoclay dispersion in non-polar resins and are likely not commercially viable.

The present invention provides a practical way to disperse smectite clays into thermoplastic polymers without resorting to expensive processes or special resin materials to insure compatibility to produce well-dispersed nanocomposites.

OBJECT AND SUMMARY OF THE INVENTION

OBJECT OF THE INVENTION

It is an object of the invention to provide a modified clay/polymer composition using a thermoplastic polymer and a smectite clay modified with organic chemicals. The organoclay used is easily dispersed into both polar and non-polar thermoplastic polymers to form a composition useful as a nanocomposite.

It is a specific object of the invention that the organoclay can be made inexpensively and the polymer needs no special compatibilizer or grafting to allow dispersion and intercalation of the organoclay into it.

SUMMARY OF THE INVENTION

This invention is of a composition comprising a polymer system and a smectite clay modified with an organic chemical composition. The modified clay an organic chemical/clay intercalate prepared by the ion exchange and reaction of a smectite clay and one or more quaternary ammonium compounds and one or more anionic organic material. The organoclay is then blended into a polymer resin to give a nanocomposite composition.

It is a surprising result that this kind of system gives improved dispersion over conventional organoclays, intercalates or even hybrid clays described in the literature, especially in non-polar resins. The organoclay composite has been found to be highly dispersible in a variety of polymers, whether polar or non-polar.

In one aspect, the present invention provides a clay/organic chemical composition that comprises: (a) one or more smectite clays, modified with (1) one or more quaternary ammonium compounds, and (2) one or more defined anionic organic materials to form an organoclay composition and (b) one or more thermoplastic polymer resins; whereby the organoclay composition is mixed or blended into the polymer resin.

Further advantages and features of the invention, as well as the scope, nature and utilization of the invention, will become apparent to those of ordinary skill in the art from the description of the preferred embodiment of the invention set forth below.

DESCRIPTION OF THE PREFERRED EMBODIMENTS

The clay, organic chemical and polymer compositions of this invention may be made using a variety of materials and by a variety of methods disclosed hereafter, or which will appear obvious when the disclosure of this patent occurs. Applicants do not intend to limit the materials or methods of manufacture of such additives by the following descriptions.

One important aspect of the invention is a clay/organic chemical and polymer composite comprising:

A reaction product obtained by the intercalation and reaction of (a) one or more smectite clays; (b) one or more quaternary ammonium compounds and (c) one or more anionic organic materials which is then dispersed into;

(d) one or more polymers.

Clays useful for element a) are smectite clays. Such clays are swellable layered clays which contain individual platelets. Useful swellable layered materials include phyllosilicates such as smectite clay minerals, e.g., montmorillonite, particularly sodium montmorillonite; bentonite; hectorite; saponite; stevensite; beidellite; and the like.

As used herein the term "interlayer spacing" refers to the distance between the internal faces of adjacent dry smectite clay platelet layers as they are assembled in the layered clay before any delamination takes place. The interlayer spacing is measured when the clay is dry; i.e. contains less than 3–6% by weight of water based on the dry weight of the material.

The clays which may be used in the present invention are preferably smectite-type clays having a cationic exchange capacity of at least 50 milliequivalents per 100 grams of clay, 100% active clay basis, as determined by the well-known ammonium acetate or methylene blue methods. Preferred smectite materials are bentonite and hectorite clays particularly of the 2:1 type having a negative charge on the layers ranging from about 0.15 to about 0.9 charges per formula unit and a commensurate number of exchangeable metal cations in the interlayer spaces.

Smectite-type clays are well known in the art and are commercially available from a variety of sources. Prior to use in the invention, the clays may preferably be converted to the sodium form if they are not already in this form. This may be conveniently carried out by preparing an aqueous clay slurry and passing the slurry through a bed of cation exchange resin in the sodium form. Alternatively, the clay can be mixed with water and a soluble sodium compound, such as sodium carbonate, sodium hydroxide, etc., and the mixture sheared, such as with a pugmill or extruder.

Representative smectite clays useful in accordance with the present invention are the following:

Montmorillonite

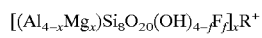

where $0.55<x<1.10$, $f<4$ and R is selected from the group consisting of Na, Li, $NH_4$, and mixtures thereof;

Bentonite

where $0<x<1.10$, $0<y<1.10$, $0.55<(x+y)<1.10$, $f<4$ and R is selected from the group consisting of Na, Li, $NH_4$, and mixtures thereof;

Hectorite

where $0.57<x<1.15$, $f<4$ and R is selected from the group consisting of Na, Li, $NH_4$, and mixtures thereof;

Saponite

where $0.58<x<1.18$, $0<y<0.66$, $f<4$ and R is selected from the group consisting of Na, Li, $NH_4$, and mixtures thereof; and Stevensite

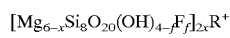

where $0.28<x<0.57$, $f=4$ and R is selected from the group consisting of Na, Li, $NH_4$, mixtures thereof.

Beidellite

where $0.55<x<1.10$, $0<y<0.44$, $f<4$ and R is selected from the group consisting of Na, Li, $NH_4$, and mixtures thereof;

The preferred clays used in the present invention are bentonite and hectorite. Bentonite and its properties are described at length in the chapter entitled "Bentonite," in Carr, D., ed. 1994, *Industrial Minerals and Rocks*, 6th Edition (published by the Society For Mining, Metallurgy and Exploration, Colorado).

It will be understood that both sheared and non-sheared forms of the above-listed smectite clays may be employed. In addition, the smectite clay employed can be either crude (containing gangue or non-clay material) or beneficiated (gangue removed). The ability to use crude clay in the smectite-type clay of this invention represents a substantial cost savings, since the clay beneficiation process and conversion to the sodium form do not have to be carried out.

Compound(s) (b) of the invention can be any quaternary ammonium compound. Particularly useful are quaternary ammonium compound(s) which includes those having the formula:

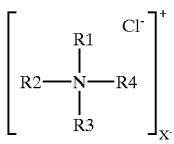

wherein R₁ comprises a group selected from (i) linear or branched aliphatic, aralkyl, or aromatic hydrocarbon groups having from 8 to 30 carbon atoms or (ii) alkyl or alkyl-ester groups having 8 to 30 carbon atoms; $R_2$, $R_3$ and $R_4$ are independently selected from the group consisting of (a) linear or branched aliphatic, aralkyl and aromatic hydrocarbon, fluorocarbon or other halocarbon groups having from 1 to about 30 carbon atoms; (b) alkoxylated groups containing from 1 to about 80 moles of alkylene oxide; (c) amide groups, (d) oxazolidine groups, (e) allyl, vinyl, or other alkenyl or alkynyl groups possessing reactive unsaturation and (f) hydrogen; and X' comprises an anion selected from the group consisting of chloride, methyl sulfate, acetate, iodide and bromide, preferably chloride. For purposes of this invention, quaternary phosphonium and sulfonium based salts are defined as within the definition of quaternary ammonium compound.

The raw materials used to make the quaternary amonium compounds can be derived from natural oils such as tallow, soya, coconut and palm oil. Useful aliphatic groups in the above formula may be derived from other naturally occurring oils including various vegetable oils, such as corn oil, coconut oil, soybean oil, cottonseed oil, castor oil and the like, as well as various animal oils or fats. The aliphatic groups may likewise be petrochemically derived from, for example, alpha olefins. Representative examples of useful branched, saturated radicals included 12-methylstearyl and 12-ethylstearyl.

Examples of useful aromatic groups, that is benzyl and substituted benzyl moieties, include benzyl and benzylic-type materials derived from benzyl halides, benzhydryl halides, trityl halides, halo-phenylalkanes wherein the alkyl chain has from 1 to 30 carbon atoms, such as 1-halo-1-phenyloctadecane; substituted benzyl moieties, such as those derived from ortho-, meta- and para-chlorobenzyl halides, para-methoxybenzyl halides, ortho-, meta- and para-nitrilobenzyl halides, and ortho-, meta- and para-alkylbenzyl halides wherein the alkyl chain contains from 1 to 30 carbon atoms; and fused ring benzyl-type moieties, such as those derived from 2-halomethylnaphthalene, 9-halomethylanthracene and 9-halomethylphenanthrene, wherein the halo group comprises chloro, bromo, or any other such group which serves as a leaving group in the nucleophilic attack of the benzyl type moiety such that the nucleophile replaces the leaving group on the benzyl type moiety.

Examples of other aromatic groups include aromatic-type substituents such as phenyl and substituted phenyl; N-alkyl and N,N-dialkyl anilines, wherein the alkyl groups contain between 1 and 30 carbon atoms; ortho-, meta- and para-nitrophenyl, ortho-, meta- and para-alkyl phenyl, wherein the alkyl group contains between 1 and 30 carbon atoms; 2-,3-, and 4-halophenyl wherein the halo group is defined as chloro, bromo, or iodo; and 2-, 3-, and 4-carboxyphenyl and esters thereof, where the alcohol of the ester is derived from an alkyl alcohol, wherein the alkyl group contains between 1 and 30 carbon atoms, aryl such as phenol, or aralkyl such as benzyl alcohols; and fused ring aryl moieties such as naphthalene, anthracene, and phenanthrene.

Some examples of preferred quaternary ammonium compounds to make the compositions of this invention are:

Dimethyl dihydrogenated tallow ammonium chloride (2M2HT):

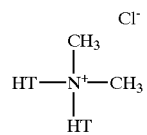

wherein HT=hydrogenated tallow.

Dimethyl dibehenyl ammonium chloride:

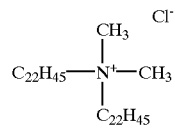

Methyl tris[hydrogenated tallow alkyl]chloride (M3HT):

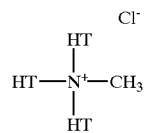

Another preferred quaternary ammonium compound for purposes of the invention comprises a quaternary ammonium salt that contains at least one, preferably two or three, hydrocarbon chains having from about 8 to about 30 carbon atoms and either no hydrophilic carbon chains or having hydrophilic radicals having a total of about 9 moles of ethylene oxide or less.

Materials suitable for element (c) of this invention include materials listed as anionic components in U.S. Pat. Nos. 4,412,018, 4,434,075 and 4,577,112. These include materials that are capable of reacting with component (b) of this invention and for intercalation with component (a) as an alkyl quaternary ammonium-organic anion complex. The molecular weight (gram molecular weight) of the organic anion is preferably 3,000 or less, and most preferably 1,000 or less and contains at least one anionic moiety per molecule as disclosed herein. The organic anion is preferably derived from an organic acid having a $pK_A$ less than about 11.0. As indicated, the source acid must contain at least one ionizable hydrogen having the preferred $pK_A$ in order to allow the formation of the alkyl quaternary ammonium-organic anion complex.

Exemplary types of suitable acidic functional organic compounds useful in this invention include:

(1) Carboxylic acids including:

a benzene carboxylic acids such as benzoic acid; ortho-, meta- and para-phthalic acid; 1,2,3-benzenetricarboxylic acid; 1,2,4-benzenetricarboxylic acid; 1,3,5-benzenetricarboxylic acid; 1,2,4,5-benzenetetracarboxylic acid; 1,2,3,4,5,6benzenehexacarboxylic acid (mellitic acid);

b alkyl carboxylic acids having the formula $CH_3(CH_2)_n$—COOH, wherein n is a number from 0 to 20; such compounds include acetic acid, pentanoic acid, hexanoic acid, heptanoic acid, octanoic acid, nonanoic acid, decanoic acid, undecanoic acid, lauric acid, tridecanoic acid, tetradecanoic acid, pentadecanoic acid, hexadecanoicanoic acid, heptadecanoic acid, octadecanoic acid (stearic acid), nonadecanoic acid, eicosonic acid.

c Alkyl dicarboxylic acids having the formula HOOC—$(CH_2)_n$—COOH wherein n is 0 to 8 such as oxalic acid; malonic acid; succinic acid; glutaric acid; adipic acid; pimelic acid; suberic acid; azelaic acid; sebacic acid;

d Hydroxyalkyl carboxylic acids such as citric acid; tartaric acids; malic acid; mandelic acid; and 12-hydroxystearic acid;

e unsaturated alkyl carboxylic acids such as maleic acid; fumaric acid; and cinnamic acid;

f Fused ring aromatic carboxylic acids such as naphthalenic acid and anthracenecarboxylic acid;

g Cycloaliphatic acids such as cyclohexanecarboxylic acid; cyclopentanecarboxylic acid; furancarboxylic acids.

(2) Organic sulfuric acids including:
  a sulfonic acids including:
    1 benzenesulfonic acids such as benzenesulfonic acid; phenolsulfonic acid; dodecylbenzenesulfonic acid; benzenedisulfonic acid; benzenetrisulfonic acids; para-toluenesulfonic acid; and
    2 alkyl sulfonic acids such as methanesulfonic acid; ethanesulfonic acid; butanesulfonic acid; butanedisulfonic acid; sulfosuccinate alkyl esters such as dioctyl succinylsulfonic acid; and alkyl polyethoxysuccinyl sulfonic acid; and
  b alkyl sulfates such as the lauryl half ester of sulfuric acid and the octadecyl half ester of sulfuric acid.

3. Organophosphorus acids including phosphonic acids, phosphinic acids, thiophosphinic acids, phosphites and phosphates as described in U.S. Pat. No. 4,412,018

4. Phenols such as phenol; hydroquinone; t-butylcatechol; p-methoxyphenol; and naphthols.

5. Thioacids as described in U.S. Pat. No. 4,412,018.

6. Amino acids such as the naturally occurring amino acids and derivatives thereof such as 6-aminohexanoic acid; 12-aminododecanoic acid; N-phenylglycine; and 3-aminocrotonic acid.

7. Polymeric acids prepared from acidic monomers wherein the acidic function remains in the polymer chain such as low molecular weight acrylic acid polymers and copolymers; styrene/maleic anhydride copolymers.

8. Miscellaneous acids and acid salts such as ferrocyanide; sodium tetraphenylborate; phosphotungstic acid; phosphosilicic acid, or any other such anion which will form a tight ion pair with an organic cation.

In addition to the above additives, silane coupling agents can also be employed that covalently bind to the clay platelets of the type $Si(R^1)_3R^2$ where $R^1$ is the same or different at each occurrence and is alkyl, alkoxy or oxysilane such as trialkoxysilane compounds such as octadecyltrimethoxysilane, 3-aminopropyltriethoxysilane, 3-aminopropyltrimethoxysilane, 3-aminopropylphenyldimethoxysilane, glycidoxypropyltripropoxysilane, propionamidotriethoxysilane, N-trimethoxysilylpropyl-N (aminoethyl)amine, trimethoxysilylundecylamine, trimethoxysilyl-2-chlorophenylethane, trimethoxysilyl ethylphenylsulfonylazide, 3-mercaptopropyltrimethoxysilane, 3-isocyanatopropyltriethoxysilane and the like; and $R^2$ is selected from the group consisting of organic radicals which are compatible with the polymer forming the composite.

Polymer resins suitable for element (d) of this invention include a very wide variety of resins and can be any plastic material whether polar or non-polar. Such resins can include polyolefins which can consist of polyethylenes, polypropylenes, polybutylenes, polymethylpentane, polyisoprenes and copolymers thereof; copolymers of olefins and other monomers such as ethylene-vinyl acetate, ethylene acid copolymers, ethylene-vinyl alcohol, ethylene-ethyl acrylate, and ethylene-methyl acrylate. Ionomers are also useful and comprise metal salts of polyolefins copolymerized with acrylic acid. Other families of thermoplastic resins useful in this invention are acetals, acrylics, and cellulosics. Fluoropolymers and copolymers with other monomers are useful such as polytetrafluoroethylene (Teflon®), fluorinated ethylene-propylene, perfluoroalkoxy resins, polychlorotrifluoroethylene, ethylene-chlorofluoroethylene copolymer, polyvinylidene fluoride and polyvinylfluoride. Liquid crystal polymers, a family of polyester copolymers, can also be used.

Additional polymers are nitrile resins, polyamides (nylons), polyphenylene ether and polyamide-imide copolymers. Various polyesters are useful such as polyarylates, polybutylene terephthalate and polyethylene terephthalate. Engineering resins such as polycarbonate, polyetherimide, polyetheretherketone, polyphenylene sulfide and thermoplastic polyimides are good candidates. Polystyrene and copolymers such as ABS, SAN, ASA and styrene-butadiene are appropriate. Also included are the sulfone based resins such as polysulfone, polyethersulfone and polyarylsulfone. Elastomers comprising a wide variety of useful materials and include olefinic TPE's, polyurethane TPE's, and styrenic TPE's. Chlorinated polymers such as PVC, and polyvinylidene dichloride can also be used. In addition, miscible or immiscible blends and alloys of any of the above resin combinations are useful for this invention. Thermoset polymers such as epoxies, polyester resins and curing rubbers can also be used.

The materials (b) and (c) can be reacted and intercalated together, or in any order, with the smectite clay and the resultant product blended with the polymer to produce an inventive nanocomposite composition. As an alternative, the resultant product can be blended with a monomer or monomers for subsequent polymerization to make the polymer compositions of this invention.

At least two general methods can be used to make these anionic-cationic organoclays. One is to first disperse the smectite clay in water. The clay is preferably dispersed in water at a concentration of from about 1 to 80%, most preferably from about 2 to 8% by weight. Optionally, the slurry may be centrifuged to remove non-clay impurities that constitute about 10% to 50% of the starting clay composition. The anionic organic material is added to the clay/water dispersion and mixed. This mixture can then be heated and ion exchanged with a quaternary ammonium compound to form the final organoclay as coagulate, which is washed with water and isolated by filtration.

The second general method to prepare this invention uses dry clay that is intimately mixed with the anionic organic material in a heated device, such as an extruder. The mixture can also have some water present to facilitate intercalation. After the addition is complete, the quaternary ammonium compound is added and the final product is isolated. This composition can be washed with water and dried.

Both of the methods mentioned above can be modified by either: 1) reversing the order of addition, i.e., reacting the clay with the quaternary ammonium ion followed by the anionic organic material; or 2) adding the quaternary ammonium compound and anionic organic material to the clay simultaneously.

The reaction is followed by drying and grinding the organoclay product. Incorporation of the organoclay into the plastic resin can be accomplished by mixing or blending the organoclay by any means that can create sufficient shear. The shear can be provided by any appropriate method such as mechanical, thermal shock, pressure changes or ultrasonics as known in the art. Particularly useful are methods where a flowable polymer is mixed with the anionic-quaternary organoclay by mechanical means such as extruders, roll mills, stirrers, Banbury® type mixers, Brabender® type mixers and continuous mixers. Other methods for making this invention can be postulated by those knowledgeable in the art.

Nanocomposites that are made by these methods using the compositions of this invention will typically exhibit improved tensile modulus, tensile strength, gas barrier and heat distortion temperature values when sufficient energy is imparted to the blend to create substantially intercalated or exfoliated mixtures.

The preferred amounts and types of clays, anionic organic material, quaternary ammonium compound and polymers used to make the compositions of this invention will vary depending upon the type of matrix polymer that each composition is to be mixed into with the goal to achieve substantially complete exfoliation of the clay platelets in the matrix polymer. This amount is defined as the millequivalent ratio which is the number of milliequivalents (M.E.) of the organic anion in the organoclay per 100 grams of clay, 100% active clay basis. It is typical that the ratio of component (c) will have an anion milliequivalent ratio of 5 to 100 and more preferably 10 to 50. The ratio of component (b) to component (a) clay will be determined by the ability to make the final product sufficiently hydrophobic to allow for good incorporation in the polymer matrix. This will vary depending on the hydrophobicity of the carbon chains attached to the quaternary and the polarity of the polymer to be blended with. Typically, at least 75 M.E. of organic cation, more typically 95 to 120 M.E. of quaternary salt based on the M.E. of the clay are preferred.

A preferred clay/organic chemical composition for purposes of the instant invention is comprised of:
1. The ion-exchanged reaction product of:
   (a) a smectite-type clay having a cation exchange capacity of at least 50 milliequivalents per 100 grams of clay; and
   (b) one or more quaternary ammonium compounds in an amount of from about 20% to about 200% of the cation exchange capacity of the smectite-type clay and
   (c) one or more anionic organic materials in an amount of 1% to 100% of the cation exchange capacity of the smectite-type clay; and
2. One or more thermoplastic resins or copolymers where the amount of organoclay from the reaction of (a), (b) and (c) above is from 0.1% to 40% of the weight of the polymer resin.

The smectite-type clay can be sheared in slurry form prior to reaction with the quaternary ammonium salt, or treated in solid form with a pugmill or similar apparatus.

EXAMPLE I

In a baffled three liter reactor with efficient stirring was placed 1500 g of a prehydrated aqueous hectorite clay slurry (concentration of clay=2.8%). The mixture was heated to 70° C. with stirring. A mixture of quaternary ammonium salt and one or more anionic materials was then added to the slurry. The solution was mixed at temperature for an additional 45 minutes.

The precipitated product was filtered on a large Büchner funnel and redispersed in 1 L of water at 70° C. to wash the organoclay. The final product was refiltered, dried at 60° C. in an oven to give a moisture content below 0.5%, and ground to less than 325 mesh. The exact compositions of the materials prepared are indicated in Table I.

TABLE I

| | Organoclays Prepared with Quaternary and Anionic Material | | | | |
|---|---|---|---|---|---|
| Designation | Clay | Quaternary | Quat. amount[1] | Anion | Anionic amount[1] |
| 1A | Hectorite | 2M2HT[2] | 40.5% | SLS[3] | 4.8% |
| 1B | Bentonite | 2M2HT[2] | 40.5% | SLS[3] | 4.8% |
| 1C | Bentonite | MB2HT[4] | 43.1% | SLS[3]/NaBz[5] | 3.3%/0.4% |
| 1D | Bentonite | MB2HT[4] | 41.1% | NaSt[6] | 4.0% |
| 1E | Hectorite | 3MHT[7] | 29.2% | SLS[3] | 5.6% |

[1]As percentage of product organoclay, dry weight basis.
[2]Bis(hydrogenated tallow) dimethyl ammonium chloride
[3]Sodium lauryl sulfate
[4]Bis(hydrogenated tallow) benzyl methyl ammonium chloride
[5]Sodium benzoate
[6]Sodium stearate
[7]Hydrogenated tallow trimethylammonium chloride

Comparative Example I

For purposes of comparison, a series of organoclays was prepared that is similar to those in Example I but which contain no anionic material.

In a baffled three liter reactor with efficient stirring was placed 1500 g of a prehydrated aqueous bentonite clay slurry (concentration of clay=2.8%). The mixture was heated to 70° C. with stirring. Molten quaternary ammonium salt was then added to the slurry. The solution was mixed at temperature for an additional 45 minutes.

The precipitated product was filtered on a large Büchner funnel and redispersed in 1 L of water at 70° C. to wash the organoclay. The final product was refiltered, dried at 60° C. in an oven to give a moisture content below 0.5%, and ground to less than 325 mesh.

The exact compositions of the materials prepared are indicated in Table II.

TABLE II

Organoclays Prepared with Quaternary Only

| Designation | Clay | Quaternary | Quaternary amount[1] |
|---|---|---|---|
| 2A | Hectorite | 2M2HT[2] | 35.4% |
| 2B | Bentonite | 2M2HT[2] | 35.4% |
| 2C | Bentonite | MB2HT[3] | 42.0% |
| 2D | Hectorite | 3MHT[4] | 28.4% |

1As percentage of product organoclay, dry weight basis.
2Bis(hydrogenated tallow) dimethyl ammonium chloride
3Bis(hydrogenated tallow) benzyl methyl ammonium chloride
4Hydrogentated tallow trimethylammonium chloride

EXAMPLE II

A selection of materials from Example I and Comparative Example I were tested to determine their ability to disperse in polypropylene. Profax 6523, a standard grade of polypropylene resin sold by Montell USA, Inc. was used. The polymer was worked on a roll mill at 365° F. for 2 minutes to form a melt and an amount of the compositions was added as indicated in Table III.

TABLE III

Organoclays Dispersed in PP 6523 Polypropylene

| Organoclay | Loading[1] | Dispersion[2] |
|---|---|---|
| 1A | 6.0% | Excellent |
| 2A | 6.0% | Poor |
| 1B | 6.0% | Excellent |
| 2B | 6.0% | Very Good |
| 1C | 6.0% | Excellent |
| 2C | 6.0% | Excellent |
| 1E | 6.0% | Fair |
| 2D | 6.0% | Poor |

[1]As percent of polymer weight
[2]Dispersion ranked on a 1–5 scale (Poor, Fair, Good, Very Good, Excellent) by visual inspection and SEM/XRay microprobe.

The data show a clear improvement in dispersibility for clays containing anionic materials in addition to quaternary ammonium salt.

EXAMPLE III

A selection of materials from Example I and Comparative Example I were tested to determine their ability to disperse in PETG, an amorphous grade of thermoplastic polyester from Eastman Chemical. The polymer was melted and worked on a roll mill at 350° F. for 2 minutes to form a melt and an amount of the compositions was added as indicated in Table III.

TABLE IV

Organoclays Dispersed in PETG Polyester

| Organoclay | Loading[1] | Dispersion[2] |
|---|---|---|
| 1A | 6.0% | Excellent |
| 2A | 6.0% | Poor |
| 1B | 6.0% | Excellent |
| 2B | 6.0% | Very Good |
| 1C | 6.0% | Excellent |
| 2C | 6.0% | Excellent |
| 1E | 6.0% | Fair |
| 2D | 6.0% | Poor |

[1]As percent of polymer weight
[2]Dispersion ranked on a 1–5 scale (Poor, Fair, Good, Very Good, Excellent) by visual inspection and SEM/XRay microprobe.

EXAMPLE IV

A selection of materials from Example I and Comparative Example I were tested to determine their ability to disperse in Nylon 6. Capron 8202, a standard grade Nylon 6 resin from Allied Signal Corp. was used. The polymer was extruded on a twin screw mixer with the organoclay indicated at a level twice that of the intended concentration, and then let down to the intended concentration with a second pass.

TABLE V

Organoclays Dispersed in Nylon 6

| Organoclay | Loading[1] | Dispersion[2] |
|---|---|---|
| 1A | 6.0% | Very Good |
| 2A | 6.0% | Poor |
| 1B | 6.0% | Very Good |
| 2B | 6.0% | Very Good |

[1]As percent of polymer weight
[2]Dispersion ranked on a 1–5 scale (Poor, Fair, Good, Very Good, Excellent) by visual inspection and SEM/XRay microprobe.

Comparison of materials using organoclays 1A and 2A clearly demonstrate the improvement in dispersibility gained by the presence of the anionic material. The bentonite based organoclays were roughly equivalent.

EXAMPLE V

A selection of materials from Example I and Comparative Example I were tested to determine their ability to disperse in an elastomeric material. Vistalon 404, an ethylene-propylene rubber, was used. The polymer was worked on a two roll mill at 180° F. for several minutes and an amount of the organoclays was added as indicated in Table III.

TABLE VI

Organoclays Dispersed in Ethylene-Propylene Rubber

| Organoclay | Loading[1] | Dispersion[2] |
|---|---|---|
| 2B | 6.0% | Poor |
| 1C | 6.0% | Very Good |
| 1D | 6.0% | Excellent |

[1]As percent of polymer weight
[2]Dispersion ranked on a 1–5 scale (Poor, Fair, Good, Very Good, Excellent) by visual inspection and SEM/XRay microprobe.

The organoclays containing anionic material clearly dispersed more quickly and completely in the polymer than those without it.

What we claim:

1. A polymer composition comprised of:
   (I) an organoclay which is the ion-exchanged reaction product of:
     (a) a smectite clay; and (b) one or more quaternary ammonium compounds in an amount of from about 20% to about 200% of the cation exchange capacity of the smectite clay and (c) one or more anionic organic materials in an amount of 1% to 100% of the cation exchange capacity of the smectite clay and (II) one or more thermoplastic polymers.

2. The composition of claim 1 wherein the amount of reaction and intercalation product of I(a), (b) and (c) is from 0.1% to 40% of the weight of the one or more polymers.

3. The composition of claim 1 wherein the ion-exchanged product is obtained by the intercalation and reaction of:

a) one or more smectite clays having a cation exchange capacity of at least 50 milliequivalents per 100 grams of clay;

b) one or more quaternary ammonium compounds selected from the group consisting of 2M2HT and M3HT and;

c) one or more anionic organic materials.

4. The composition of claim 1 wherein one or more of the quaternary ammonium compound has the formula:

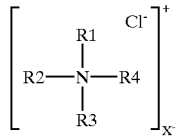

wherein $R_1$ comprises a group selected from (i) linear or branched aliphatic, aralkyl, or aromatic hydrocarbon groups having from 8 to 30 carbon atoms or (ii) alkyl or alkyl-ester groups having 8 to 30 carbon atoms; $R_2$, $R_3$ and $R_4$ are independently selected from the group consisting of (a) linear or branched aliphatic, aralkyl and aromatic hydrocarbon, fluorocarbon or other halocarbon groups having from 1 to about 30 carbon atoms; (b) alkoxylated groups containing from 1 to about 80 moles of alkylene oxide; (c) amide groups, (d) oxazolidine groups, (e) allyl, vinyl, or other alkenyl or alkynyl groups possessing reactive unsaturation and (f) hydrogen; and X' comprises an anion selected from the group consisting of chloride, methyl sulfate, acetate, iodide and bromide.

5. The composition of claim 1 wherein one or more of the anionic organic materials is selected from the groups consisting of carboxylic acids and organic sulfuric acids.

6. The composition of claim 1 wherein the one or more thermoplastic polymers are selected from the group consisting of plastics and resins.

7. The composition of claim 1 wherein one or more of the thermoplastic polymers is selected from the group consisting of polyolefins, copolymers thereof; copolymers of olefins and ethylenevinyl acetate, ethylene acid copolymers, ethylene-vinyl alcohols, ethylene-ethyl acrylates, and ethylene-methyl acrylates.

* * * * *